United States Patent [19]
Spengler

[11] 3,768,807
[45] Oct. 30, 1973

[54] METHOD AND APPARATUS FOR HANDLING FLAT, FLEXIBLE WORKPIECES

[75] Inventor: Ernst M. Spengler, Heustenstamm, Germany

[73] Assignee: Stanztechnik GmbH Roeder & Spengler, Bergen-Enkheim, Germany

[22] Filed: Aug. 4, 1971

[21] Appl. No.: 169,006

[30] Foreign Application Priority Data
Aug. 10, 1970 Austria .............................. 7267/70
Mar. 1, 1971 Austria .............................. 1734/71
Mar. 29, 1971 Austria .............................. 2652/71

[52] U.S. Cl. ................... 271/190, 214/6 DK, 271/5
[51] Int. Cl. ........................ B65h 29/36, B65h 3/50
[58] Field of Search .................... 271/68, 67, 75–78, 271/5, 12, 73; 214/6 G, 6 H, 6 DK; 198/123, 94

[56] References Cited
UNITED STATES PATENTS

| | | | |
|---|---|---|---|
| 768,841 | 8/1904 | Brown | 198/123 |
| 2,019,560 | 11/1935 | Couch | 271/76 |
| 2,820,633 | 1/1958 | Caulfield | 271/76 |
| 2,859,965 | 11/1958 | Pabst et al. | 271/68 |
| 3,112,364 | 2/1964 | Kinker | 271/73 |
| 3,598,252 | 8/1971 | Billett et al. | 214/6 DK |

Primary Examiner—Richard E. Aegerter
Assistant Examiner—Bruce H. Stoner, Jr.
Attorney—W. G. Fasse

[57] ABSTRACT

This apparatus handles flat, flexible workpieces, such as pieces of textile coming from or going to a punching machine disposed adjacent to the present handling apparatus. In other words, the workpieces may be stacked or removed from a stack. A movable surface, such as an endless conveyor delivers or receives the workpieces to or from a transfer means passing over the stack. The transfer means, in one embodiment, are parallel rods arranged in groups spaced from each other and rotatably supported at both ends in driven means such as endless chains the direction of movement of which is reversible. In another embodiment, the transfer means is an endless belt which is movable back and forth over the stack. Auxiliary means, such as workpiece retarding bands and/or lifting means may be arranged for cooperation with the transfer means. When a workpiece is deposited, the transfer means are withdrawn from under the workpiece either in the advancing or in the reverse direction whereby the workpiece is gradually deposited on the stack. When the workpieces are removed a leading edge of the top workpiece is lifted, for example, by suction means, and the transfer means glide under the workpiece.

10 Claims, 15 Drawing Figures

Patented Oct. 30, 1973

INVENTOR
ERNST M. SPENGLER

BY *W. G. Gasse*

ATTORNEY

METHOD AND APPARATUS FOR HANDLING FLAT, FLEXIBLE WORKPIECES

BACKGROUND OF THE INVENTION

The present invention relates to a method and apparatus for handling flat workpieces, especially rather flexible workpieces, such as soft textile fabrics which are fed to or removed from the present apparatus, for example, in connection with a punching apparatus.

German Pat. No. 1,916,065 discloses a laundry stacking apparatus comprising a stacking table, and endless conveyor and a transfer mechanism which receives the laundry pieces from the conveyor and deposits them on the table. Removal from the table onto the conveyor is not possible.

OBJECTS OF THE INVENTION

It is, therefore, an object of the present invention to provide a method and apparatus for carrying out such method of handling flat, flexible workpieces such as textile blanks, which is simple and effecient for operating at high stacking and/or workpiece removing speeds.

It is another object of the present invention to stack and/or remove sheet material from a stack substantially in an uninterrupted continuous operation.

Still another object of the present invention is, to provide a stacking apparatus which may be set up at the output side of a punching or stamping machine and which is capable of receiving the blanks to automatically deposit the same onto a stack.

It is a still further object of the present invention to provide stacking apparatus which is reversible in its operation to perform a piece-wise removal of the workpieces from the stack.

It is also an object to stack sheet material so that it is supported under its entire surface until the material is over a stacking station and to then gradually deposit the material onto a stack beginning at one edge of the material whereby wrinkling is avoided.

For the piece-wise removal of sheets from a stack each sheet must also gradually slide onto a support starting from one edge thereof until the entire sheet is supported in a flat, unwrinkled position.

SUMMARY OF THE INVENTION

According to the invention there is provided an apparatus for handling flat, flexible workpieces wherein a movable surface continuously advances said workpieces in a given direction, toward or away from a stacking table arranged laterally adjacent to said movable surface, endless workpiece transfer means are arranged adjacent to said movable surface for cooperation with the movable surface and with the stacking table, drive means are connected to said transfer means for continously advancing the transfer means, guide means are arranged for cooperation with said transfer means for passing the transfer means over said stacking table whereby to transport a workpiece, and wherein auxiliary means are operatively associated with said transfer means for facilitating the handling of the workpieces being transferred. According to the invention there is further provided a method of handling flat, flexible workpieces, comprising delivering the workpieces onto a flat, movable transfer surface for supporting the workpieces in a flat position during transfer, and gradually depositing each workpiece by gradually withdrawing the supporting surface from under the workpiece beginning at one edge thereof, or gradually sliding the workpiece onto a supporting surface also by beginning at one edge thereof.

BRIEF DESCRIPTION OF THE DRAWINGS

In order that the invention may be clearly understood, it will now be described, by way of example, with reference to the accompanying drawings, in which.

DESCRIPTION OF PREFERRED EMBODIMENTS

Figure 1:
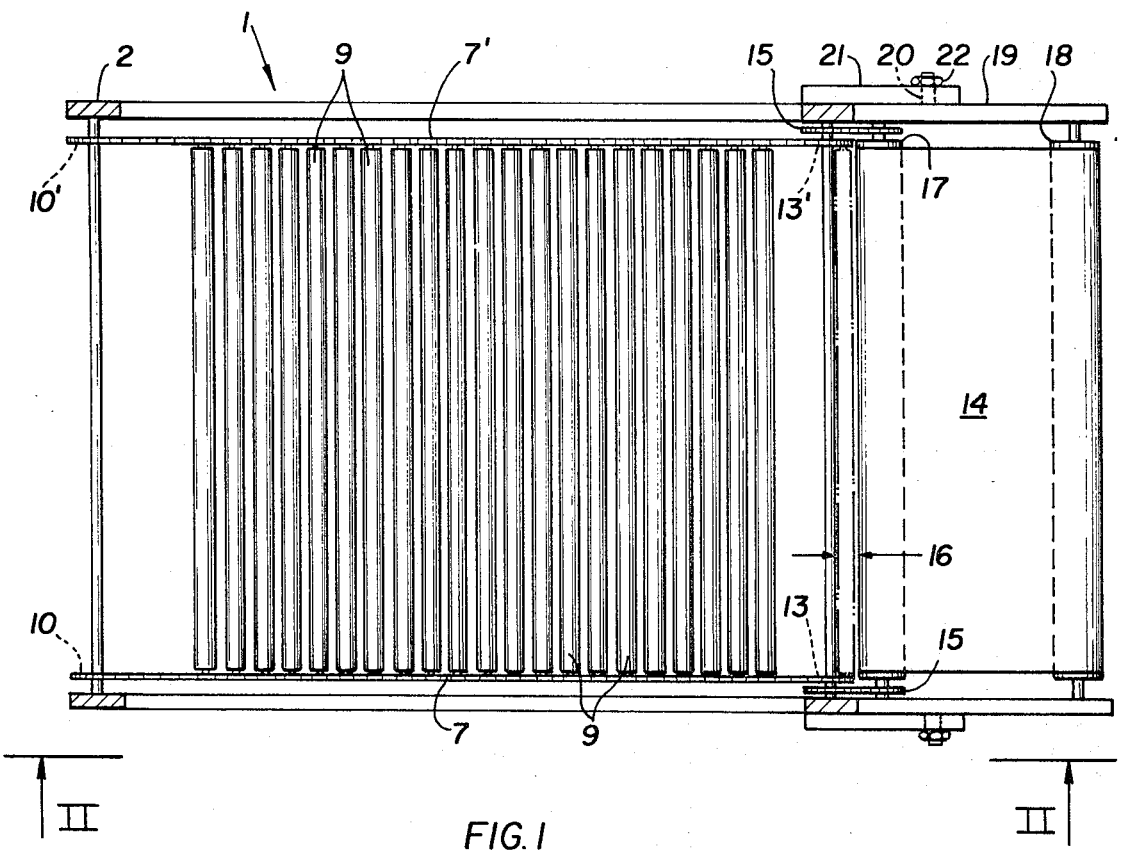
FIG. 1 is a top view onto one embodiment of the present apparatus as viewed in the direction of the arrow I shown in FIG. 2 whereby certain elements have been omitted so as not to obstruct the view of other elements.
Figure 1A:
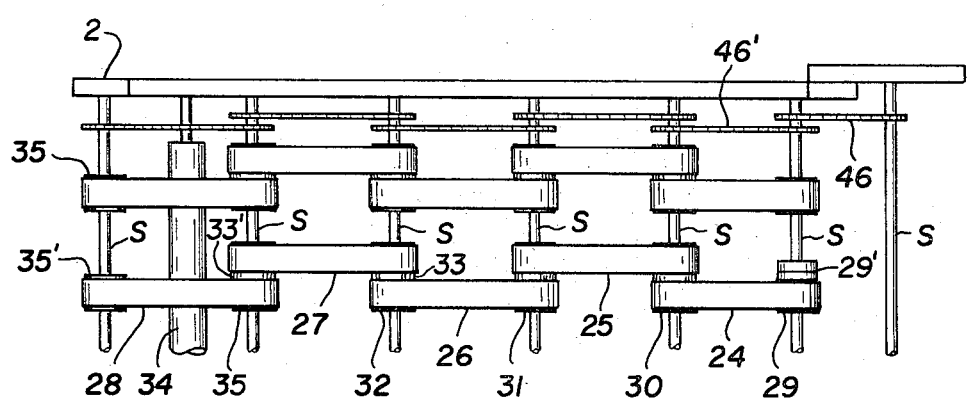
FIG. 1a is a view similar to that of FIG. 1 but illustrating one embodiment of an auxiliary belt arrangement which was omitted from FIG. 1.
Figure 2:
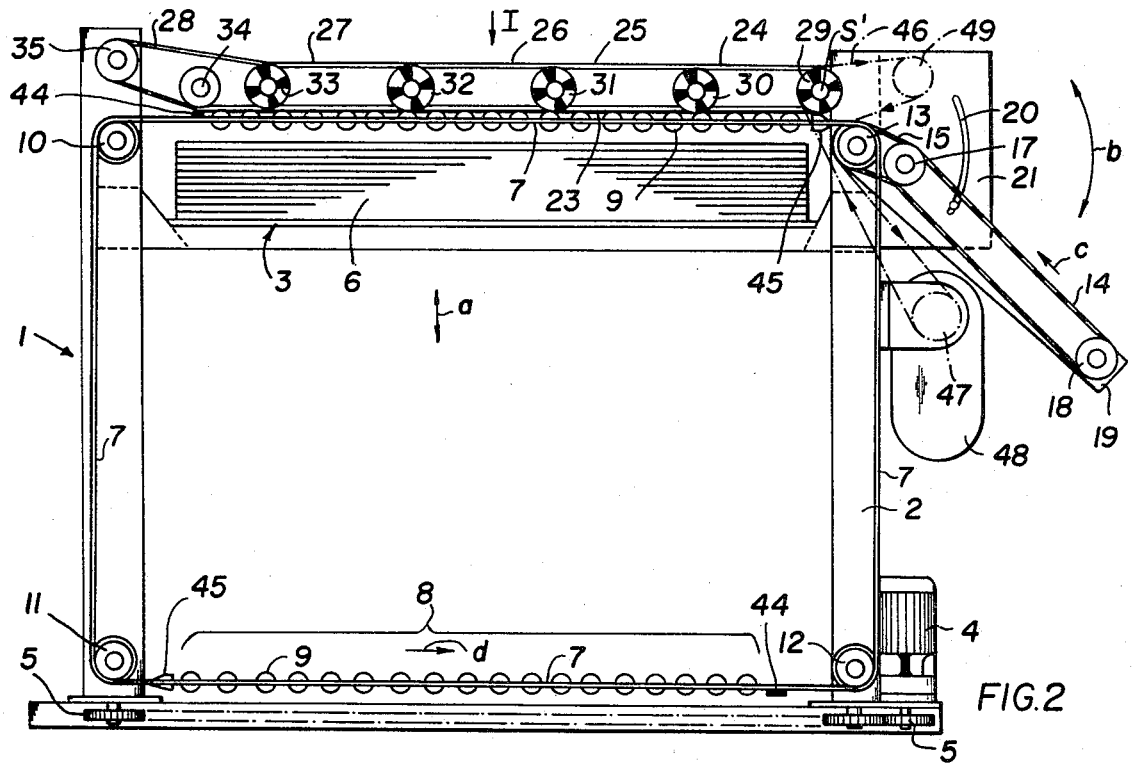
FIG. 2 is a side view of the apparatus according to the present invention generally in the direction of the arrows II shown in FIG. 1, whereby for clarity's sake, certain frame components have been omitted and wherein the depositing of a workpiece, such as a sheet of fabric, is about to begin.

Referring in conjunction to FIGS. 1, 1a, and 2, the present apparatus 1 comprises a frame structure 2 with upright posts interconnected at the top and bottom to form a rigid frame. Between the upright posts 2 and in the corners thereof, there are supported horizontal shafts for the workpiece transfer means. On the shafts in the upper and lower left corner and in the lower right corner, there are journaled idler pinions 10,10', 11 and 12. In the upper right hand corner, the shaft is journaled to the frame structure and drive sprocket wheels or pinions 13, 13' are rigidly attached to the journaled shaft for driving two chains 7,7' which run in synchronism with each other. The drive means for the sprocket wheels 13,13' or rather for the shaft to which these wheels are attached, are shown in FIG. 2 and comprise a drive motor 48 for driving a pinion 47 and a belt or chain drive 46. A tensioning roller 49 is adjustably supported on a support plate 21 for tensioning the drive means 46, as necessary. The just described drive means are shown in FIG. 2 but for simplicity's sake, they have been omitted from FIG. 1.

Groups 8 of horizontally extending rods 9 are rotatably attached to the links of the drive chains 7 and 7'. Since the chains travel in synchronism, the rods 9 remain in parallel to each other throughout their revolving motion.

Above the transfer means comprising especially the revolving and rotating groups 8 of rods 9, there are arranged auxiliary means which cooperate with the transfer means in the sheet handling. A schematic top view of the auxiliary means is seen in FIG. 1a. These auxiliary means comprise individual endless belts 24, 25, 26, 27, 28, which, for example, may be arranged in a staggered relationship and which are carried by pairs of rollers supported on respective shafts S. The belts 24 .... are slightly spaced above the rods 9, just enough so as to come into contact with a workpiece 23. For example, belt 24 is supported by rollers 29 and 30. Belt 26 is supported by rollers 31 and 32. Belt 27 is supported on a pair of rollers 33,33' and belt 28 is supported on a pair of rollers 35 and 35'. The belt 28 is tensioned by an idler roller 34.

There may be several groups of staggered belt arrangements. It will be appreciated that each belt has its own individual rollers which may be driven independently of any other pair of rollers in the arrangement. The belts are individually driven through the shafts S by coupling one of the rollers of each belt to the respective shaft, for example, by means of magnetic clutches 29' individually provided for each pair of rollers. Only one clutch 29' is shown for simplicity's sake. The shafts S may all be driven through a drive arrangement 46', the drive for which may, for example, be derived from the drive means 46.

Referring now to FIGS. 2-7 a stacking table 3 is located inside the frame structure 2 to be lowered or raised in the direction of the double arrow a by drive means 4,5.

Figure 5:
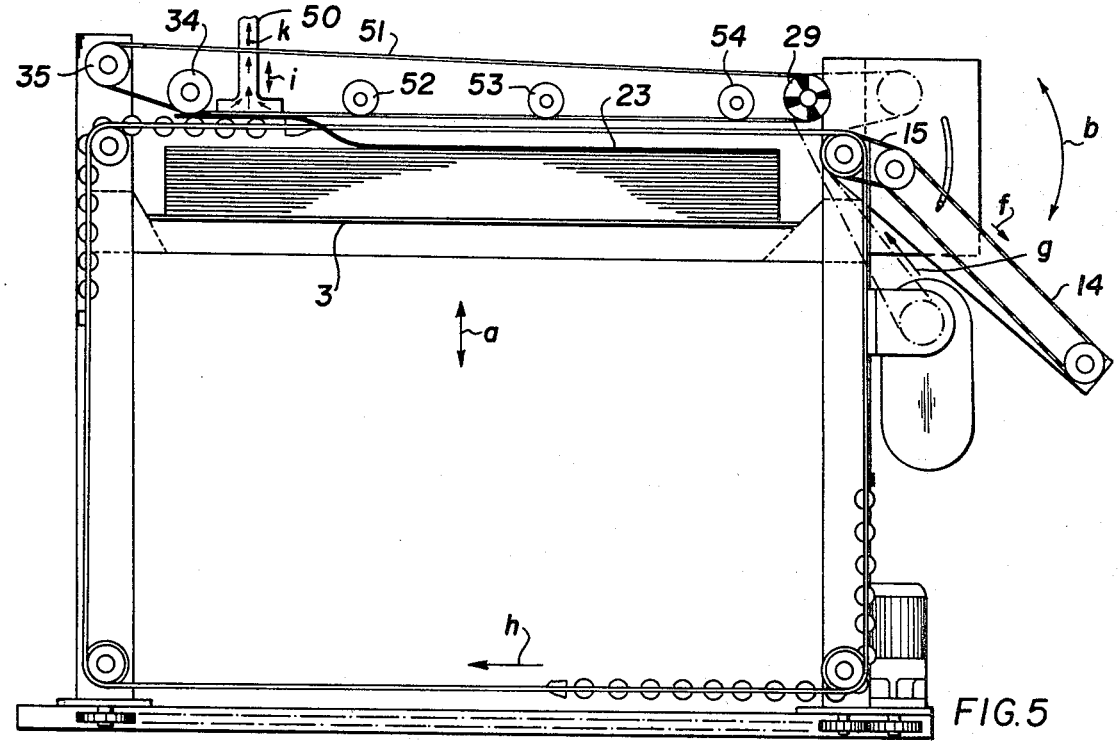
FIG. 5 is a side view of the apparatus according to the present invention incorporating the features for piecewise removal of the workpieces from the stack.

On the stacking table 3 rests a stack 6 of workpieces, such as textile sheets. The workpiece transfer means with said two endless chains 7 and 7' and said groups 8 of rods 9 are rotatably supported as described above. The arrangement is such that each group 8 of rods 9 may pass over the stack 6 on the stacking table 3 in succession when the chains are driven in one or the other direction as indicated by the arrow d (FIG. 2) or arrow h (FIG. 5).

A movable surface, for example, a conveyor belt 14 driven by drive means 15 which may derive the driving force, for example, from the drive means 46,47,48, is arranged adjacent to the transfer means for cooperation therewith. The arrangement is such that a gap 16 (FIG. 1) is provided between the upper return of the belt 14 and the transfer means 7, 7', 8, 9 so that the rods 9 can freely pass through such gap 16. The conveyor belt 14 runs over guide rollers 17 and 18 which are mounted on a swivel arm or arms 19 which may be swivelled up and down as indicated by the arrow b about the axis of the guide roller 17 whereby a pin is provided in a guide means, such as a slot 20, in a support plate 21. The arm 19 may be fixed at any desired inclination with respect to the horizontal plane by means of a nut 22 threaded to said pin. The belt 14 moves in the direction or the arrow c, when the apparatus performs a stacking operation. Incidentally, the gap 16 may be covered by a strip to facilitate the passage of the workpiece over the gap.

A workpiece 23 is delivered by the delivery belt 14 to the rods 9 against which it is held by means of said auxiliary bands 24,25..... These bands run over guide rollers 29 to 35,35'. The intermediate roller 34 presses the band 28 against the workpiece 23 on the rods 9. The rollers accurately guide the bands. It will be appreciated, that the bands 24,... and their guide rollers act as auxiliary means of the transfer means.

As mentioned, any of the guide rollers 29,.... may be individually coupled to its shaft S by said respective clutches 29',..., for example, an electromagnetic clutch. Only one of these clutches 29' is shown in FIG. 1a for simplicity's sake. Thus each belt may be individually driven or in combination with any of the other auxiliary belts. The electric circuits (not shown) for operating the clutches 29' are individually controllable so that the bands may be slowed down, or accelerated, or stopped individually indpendently of each other.

The transfer means further comprise a cross rod 44 in each group 8 of rollers 9 which is attached at its ends to the chains 7,7' ahead of the first roller in a group 8 of rollers 9 as viewed in the transport direction arrow d, that is when the chains of the transfer means move in the counterclockwise direction. The cross bar 44 aids in the transfer of the leading edge of a workpiece onto the rollers 9. Following the last roller in a group 8 as viewed in the counterclockwise moving direction there is arranged a further cross bar 45 having a wedge shaped cross section which aids in the deposition or in the removal of a workpiece as will be described in more detail below.

As mentioned, a workpiece 23 to be transferred onto the stack 6 is advanced by the conveyor belt 14 in the direction of the arrow c. The leading edge of the workpiece is then pulled in between the cross bar 44 and the auxiliary bands 24,..... As the transfer rods 9 continue to be advanced by the chains 7,7' in the counterclockwise direction the workpiece is passed completely over the stack 6 into a position as shown in FIG. 2. By deactivating the clutches 29' the driving movement of the bands 24,... is stopped and the further advance of the workpiece by these bands also stops because the friction between the bands 24 and the workpiece on the one hand is larger than the friction between the workpiece and the rotating rollers 9 on the other hand. This larger friction is sufficient to stop the workpiece in a position as shown in FIG. 2.

Figure 3:
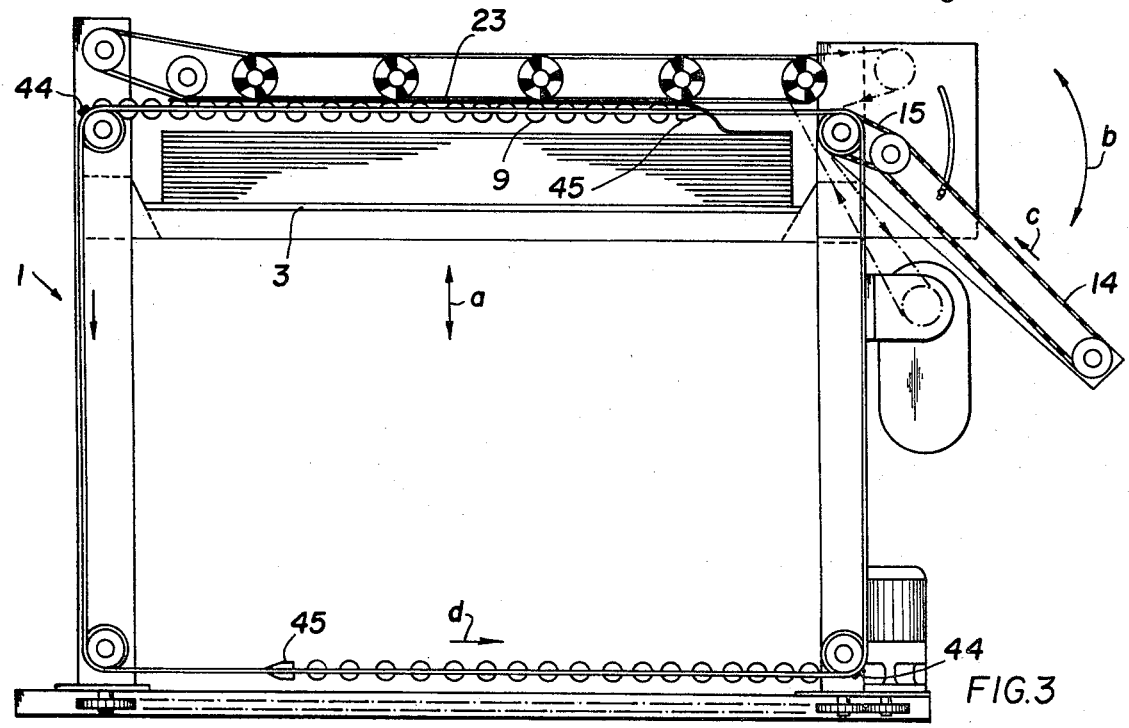
FIG. 3 is a side view of the apparatus similar to that of FIG. 2 but illustrating a different operational state wherein the sheet has been partly deposited starting at one edge thereof.
Figure 4:
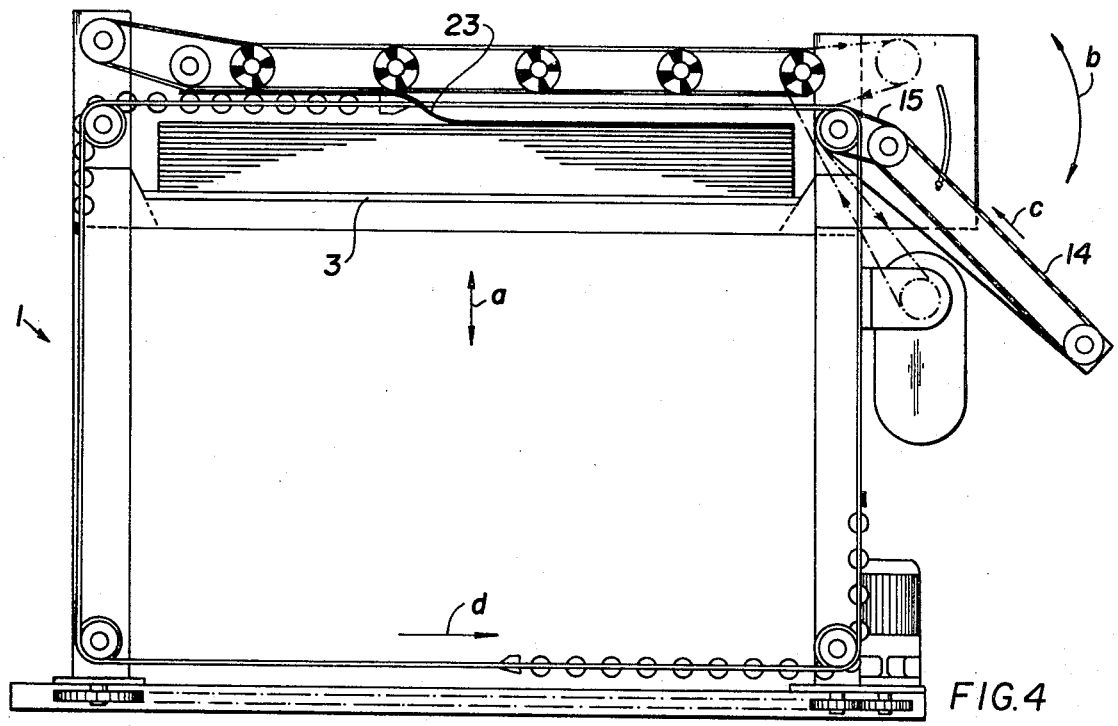
FIG. 4 is a similar view as in FIG. 3 illustrating, especially in conjunction with FIG. 3 the gradual deposition of the sheet and before the sheet has been completely deposited.

As the group 8 of rollers 9 continues to move in the counterclockwise direction, the trailing edge of the workpiece will gradually slide down over the wedge shaped cross bar 45 whereby the workpiece is gently deposited on the stack as shown in FIGS. 3 and 4. As soon as one group of rollers has completely cleared a workpiece, the next group of rollers will reach with its leading cross bar 44 the leading edge of the next workpiece. Thus, the depositing cycle may be continued without interruption.

As described with reference to FIG. 1a, it is possible to individually control the movement of each band 24, 26 and so forth, by means of the clutches 29'. This feature has the advantage that the stacking speed can be considerably increased because the workpieces 23 can now be delivered onto the stack 6 one after the other without any interruption and the delivery may overlap since the next workpiece can be picked up by the next group of rollers, even before the preceding workpiece has completely cleared the preceding group of rollers 9. For this purpose there would be more than two roller groups attached to the chains 7, 7'. With the aid of the clutches 29' it is possible to drive the auxiliary bands in succession, for example, the band 25 may still be at a standstill while the band 24 is driven to advance the next succeeding sheet. Thus, while, for example, belts 26 are still cooperating with the preceding workpiece and belts 25 stand still, the belts 24 may already be cooperating with the next following workpiece.

Figure 6:
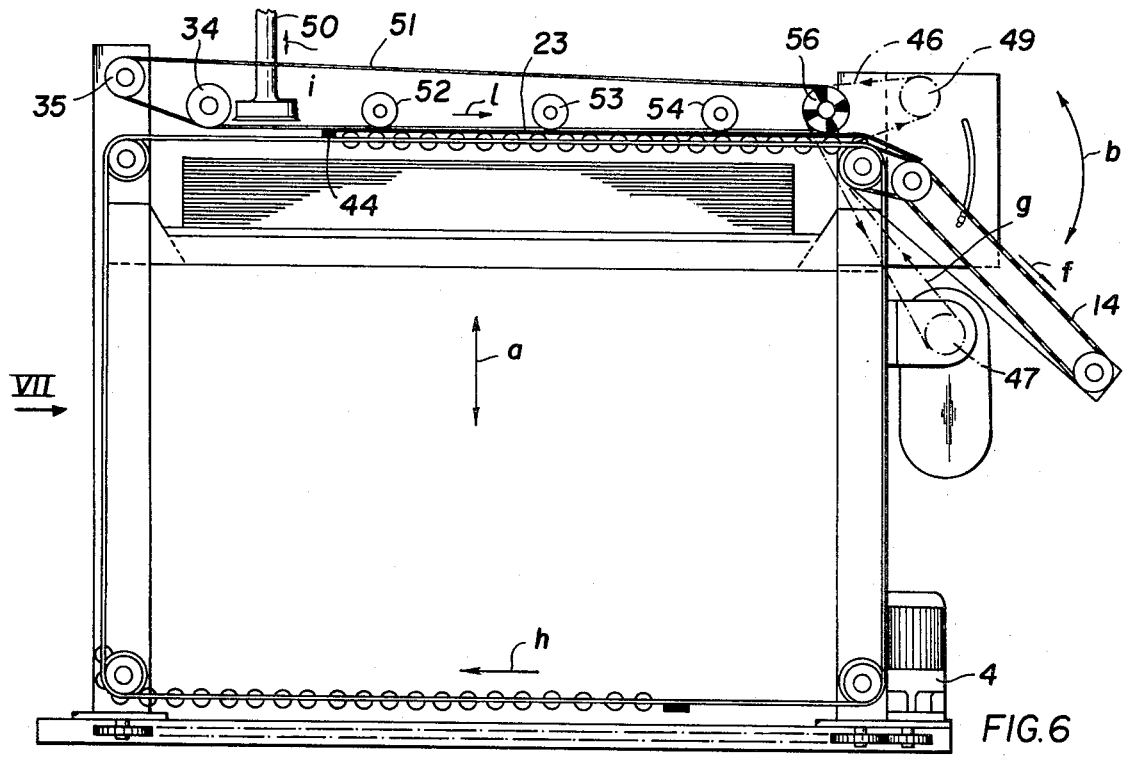
FIG. 6 is a view similar to that of FIG. 5 illustrating another operating stage wherein the removal of a workpiece is about to be completed.
Figure 7:
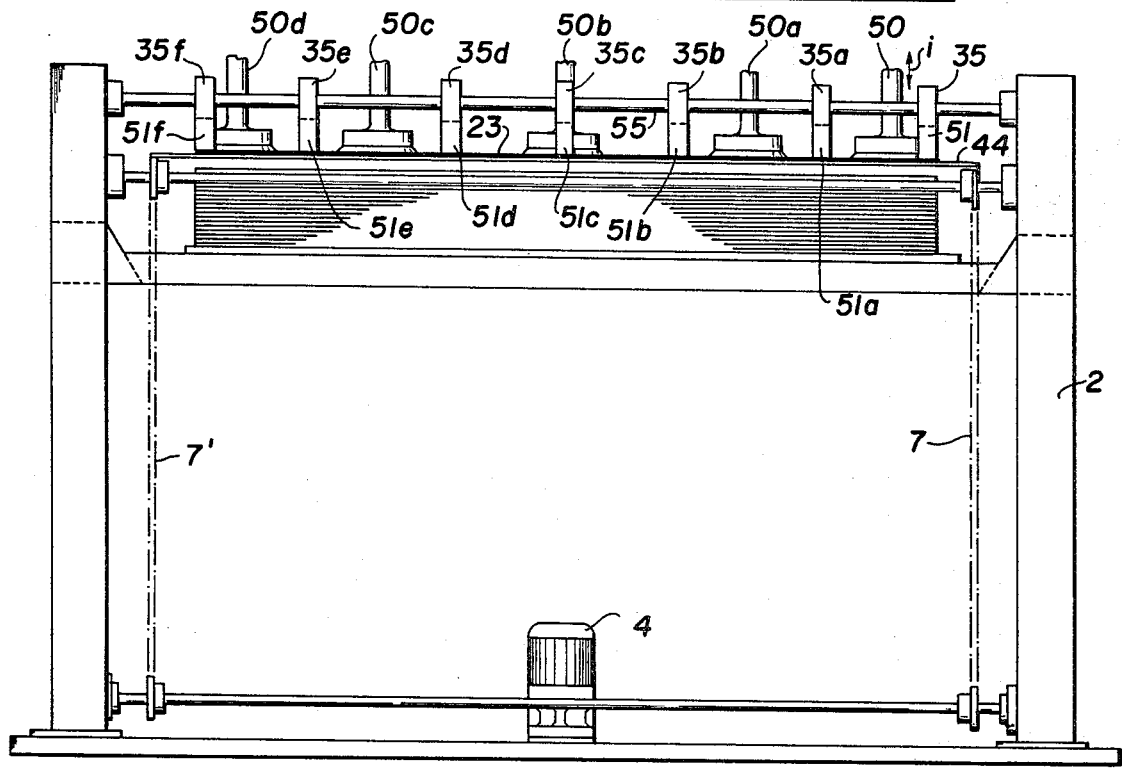
FIG. 7 is a front view of the apparatus according to FIG. 6 as viewed in the direction of the arrow VII shown in FIG. 6.

FIGS. 5, 6, and 7 illustrate another embodiment of the present invention which employs a plurality of auxiliary bands 51, 51a, 51b, 51c, 51d, 51e, and 51f (FIG. 7). These bands extend substantially over the entire length of the apparatus and in any event over the entire length of the stack. In other words, the bands 51 are not staggered as the bands shown in FIG. 1a.

The apparatus of FIGS. 5, 6, and 7 is adapted for the piecewise removal of the workpieces from the stack. For this purpose, the direction of operation is reversed. That is, the drive belt 46 now moves counterclockwise in the direction of the arrow g, the transfer chains 7,7' move in the clockwise direction of the arrow h and the conveyor belt 14 moves in the clockwise direction of the arrow f.

At the beginning of the removal operation, suction heads 50, 50a to 50d which may be raised and lowered as indicated by the arrow i are activated and exert a suction in the direction of the arrow k (FIG. 5) whereby the rear edge as viewed in the direction of removal of a workpiece 23 is lifted whereupon the now leading, wedge shaped cross bar 45 may glide under the lifted edge of the workpiece. At this stage, the bands 51 are still maintained in a stationary position whereby the workpiece is pressed against the rollers 9 until the entire group of rollers is underneath of the workpiece. As soon as the cross bar 45 has reached the right hand edge of the stack, the belts 51 are positively driven that their lower runs move to the right, that is in the direction of the arrow l as seen in FIG. 6 whereby the workpiece is moved along with the rollers 9 and onto the conveyor 14 which in this instance operates as an output conveyor. Here again, an intermediate plate (not shown) may be arranged to bridge the gap 16 for leading the edge of the workpiece onto conveyor 14. Such strip may preferably be flexible.

The endless bands 51, ... preferably run over idler rollers 52,53,54, which press the band against the workpiece 23 and thus sufficiently against the rollers 9 whereby the workpiece will be held in a stationary position until the rollers 9 have completely slipped under the workpiece. As in the stacking operation, the larger friction between the bands 51 and the workpiece, assures that the workpiece will be transported by the moving bands and by the rollers or that it will be held in position as long as the bands 51 are stationary.

Referring to FIG. 7 which is a view in the direction of arrow VII as shown in FIG. 6, it will be noted that the suction heads 50, 50a, 50b, 50c, and 50d are arranged in a row substantially above the trailing edge of the workpieces as viewed in the removal direction.

Figure 8:
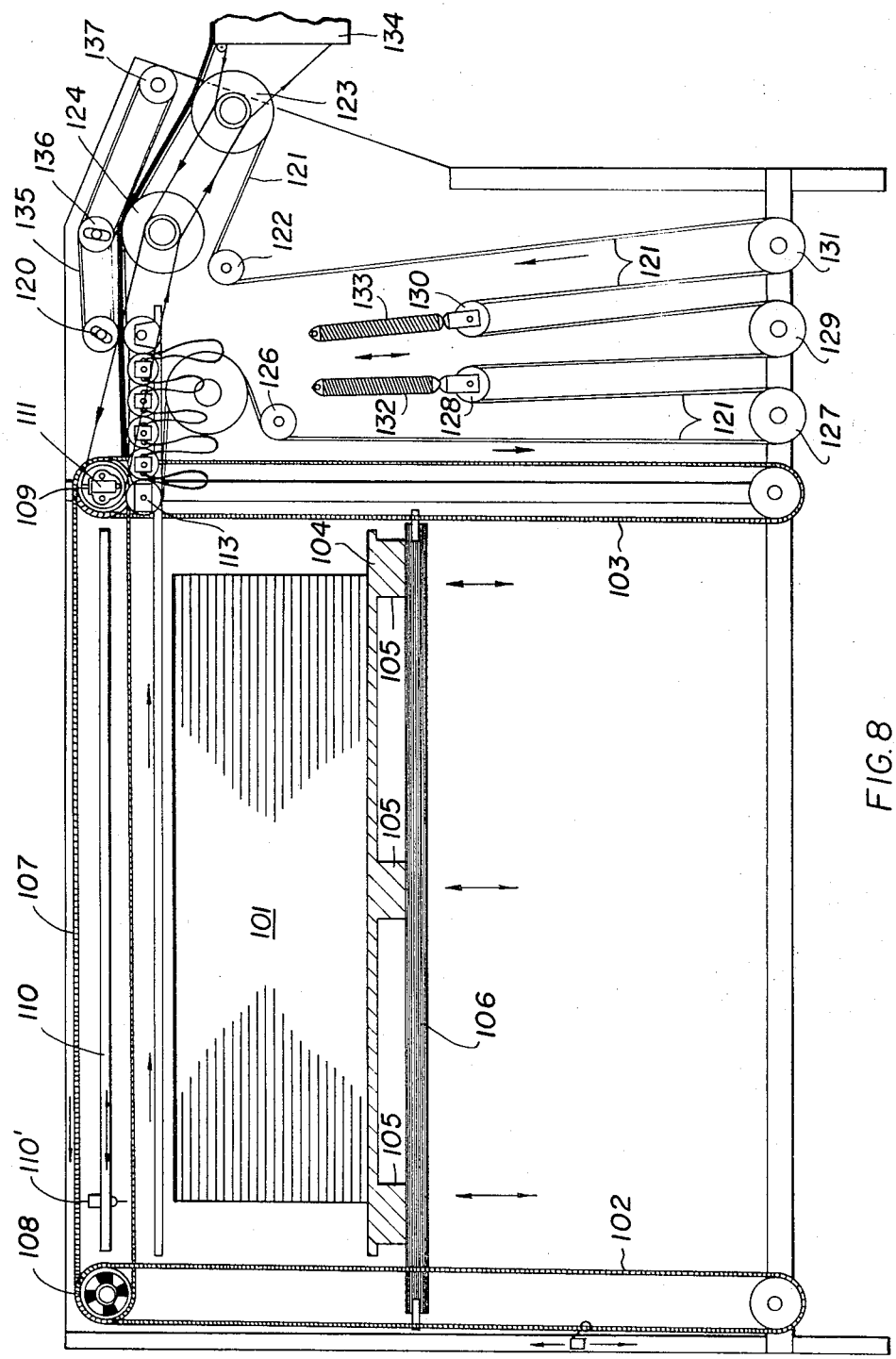
FIG. 8 is a side view of another embodiment of the stacking apparatus according to the present invention similar to FIGS. 1 to 7, but employing modified workpiece transfer means whereby these transfer means are shown in a workpiece receiving position.
Figure 9:
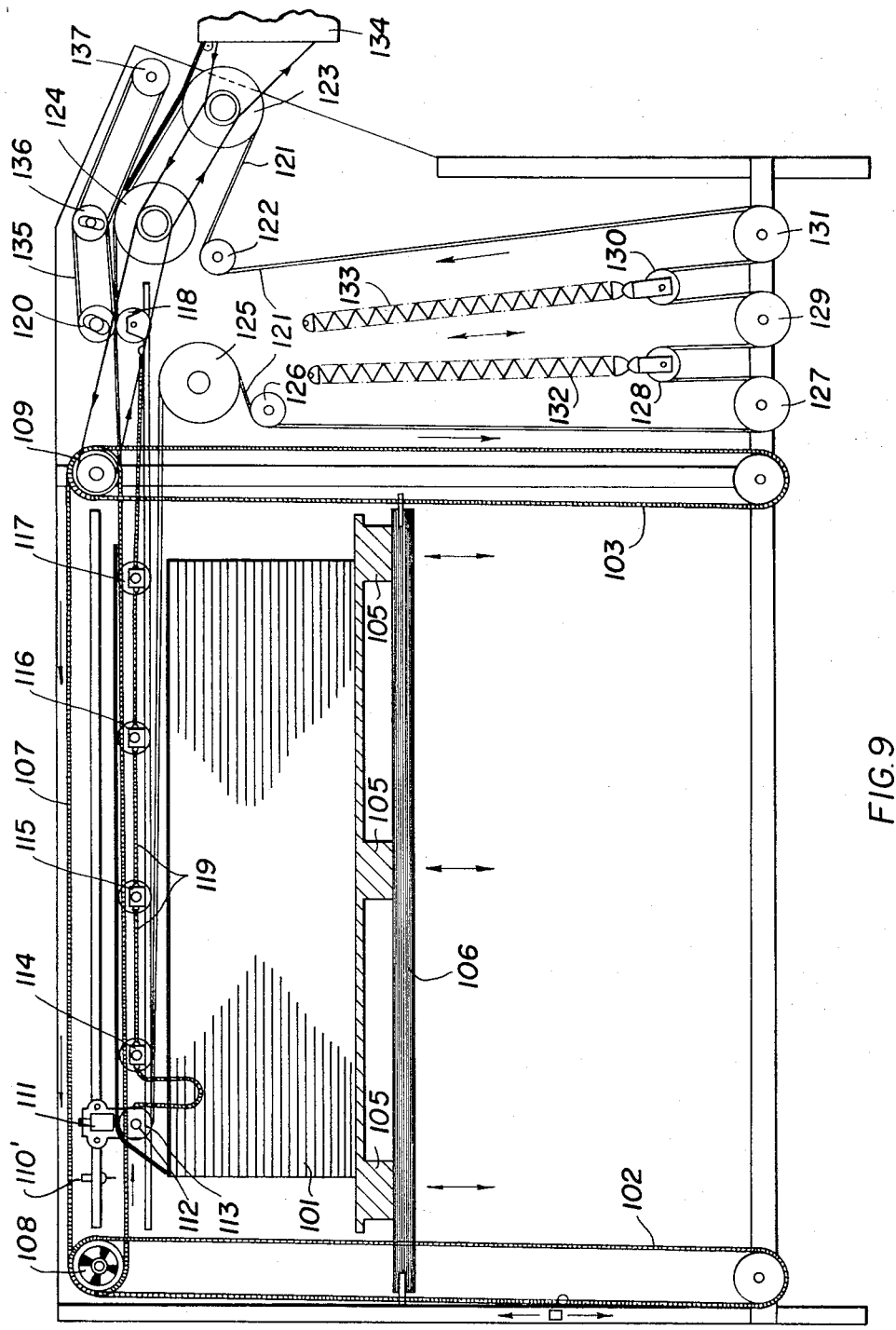
FIG. 9 is a side view similar to FIG. 8, with the transfer means at the beginning of the workpiece delivering, return stroke again beginning the deposition at one edge of the workpiece.
Figure 10:
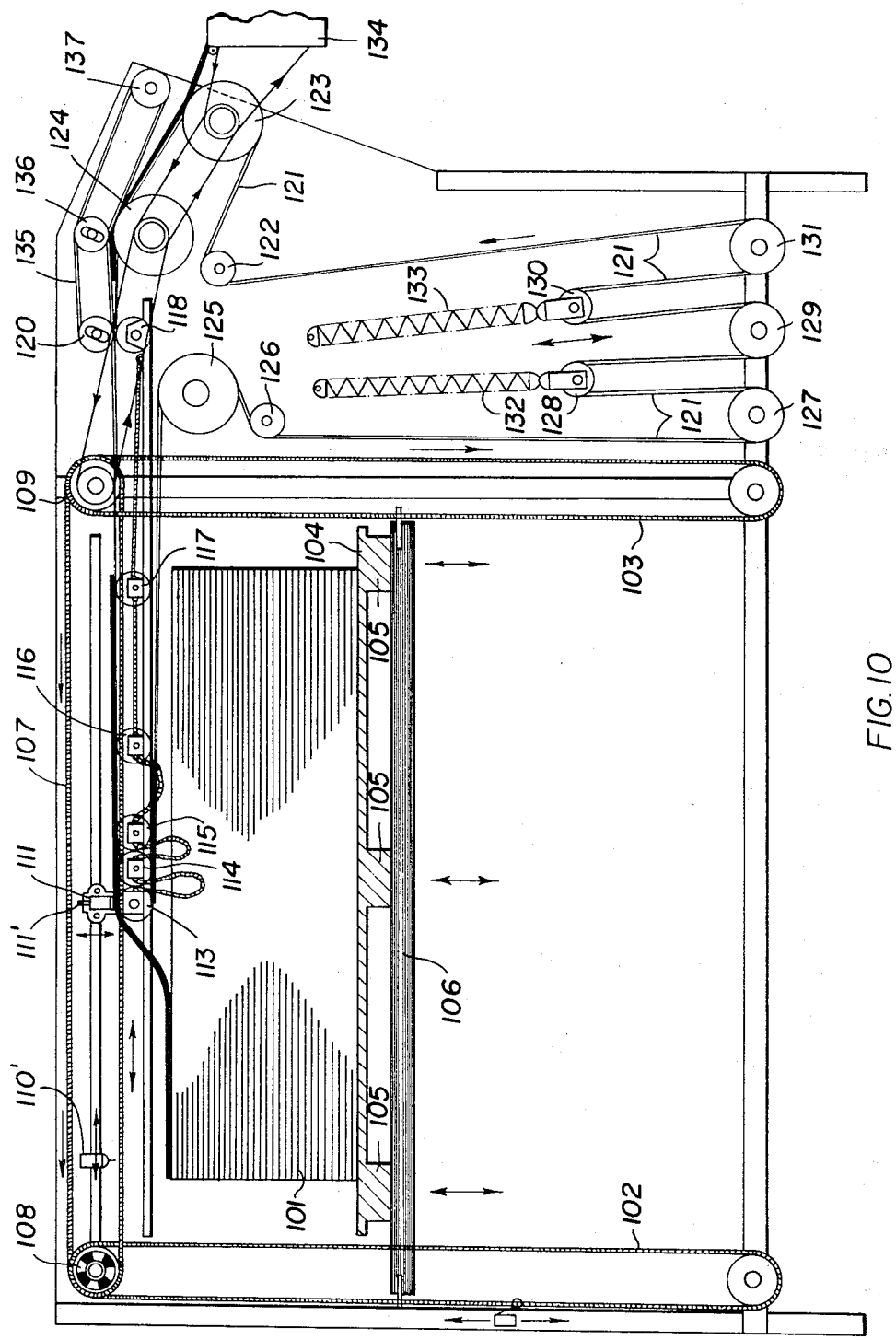
FIG. 10 is a side view similar to FIG. 9 showing the delivering stroke about halfway completed, illustrating again the gradual deposition of the workpiece.

FIGS. 8, 9, and 10 illustrate a further embodiment of the present invention wherein a stacking platform 106 for the stacking table 104 having legs 105 is attached to vertically arranged chain drive means 102 and 103, which, after each deposition of a new workpiece move the stacking platform downwardly in order to maintain the same elevation of the top surface of the stack so that each additional workpiece is deposited at the same elevation. The stack 101 rests on the stacking plate 104.

A further endless chain drive 107 having an upper and a lower horizontal run is arranged to extend above the stack 101. The chain drive 107 is supported on sprocket or drive wheels 108, 109 which are mounted on the same horizontal shafts as the sprocket wheels for the vertical chains 102 and 103. As indicated by the arrows, the chain drive 107 always moves in the same direction, that is, the upper run moves from the right to the left and the lower run runs from the left to the right as viewed in FIG. 8.

Guide means 110 are supported in the frame structure of the present apparatus so as to extend in parallel and preferably between the upper and lower run of the chain drive 107. The horizontal guide means 110 may comprise a guide rod or a slot along which or in which a carriage 111 is movable back and forth by means of the horizontal chain drive 107. For this purpose the carriage 111 is provided with coupling means, for example, a pin 111'(FIG. 10) which is secured to the carriage 111 but shiftable up and down whereby it may engage the upper run of the chain drive 107 when the pin 111' is in its upper position or the lower run of the chain drive 107 when the pin 111' is in its lower position. Accordingly, the carriage 111 will move from the right to the left when the pin engages the upper run and from the left to the right when the pin engages the lower run. Means for shifting the pin are well known in the art, for example, trip dogs 110' may be used for this purpose. By adjusting the trip dog 110' horizontally along the guide means 110 it is possible to coordinate the length of the travel of the carriage 111 to the size of the workpieces.

The carriage 111 carries a shaft 112 (FIG. 9) which in turn supports a leading carrier roller 113 which is connected to flexible means such as a cable or a chain 119 to further carrier rollers 114 to 118. The last carrier roller 118, that is the roller which is farthest removed from the leading carrier roller 113 is journaled to the frame structure in a fixed position to the right of the vertically extending chain drive 103. The intermediate carrier rollers 114, 115, 116, and 117 are journaled to laterally and horizontally extending shafts the ends of which are supported for sliding horizontal movement, for example, along rail means, not shown but attached to the frame structure.

It will be appreciated that the shown carriage 111 preferably has its mirror-symmetrical counterpart supported on the opposite members of the frame structure so that each end of the shaft 112 is supported by a carriage to provide a movable support for the leading carriage roller 113. This movable support in combination with the flexible interconnection of the carrier rollers makes it possible to pass the workpiece transfer means which include an endless belt 121 over the stack with a forward stroke (FIG. 9) and to return the transfer means to the starting position shown in FIG. 8 with a return stroke which also passes over the stack. Thus, the workpiece 23 as it is advanced by the moving surface of a feed-in conveyor 134 is passed onto the conveyor 121 of the transfer means and moved into a position completely above the stack 101 when the transfer means with its carrier rollers 113 to 117 has passed over the stack as shown in FIG. 9.

When the carriages 111 reach their forwardmost position in which the trip dog 110' is contacted, the pin 111' is shifted from its upper to its lower position whereby the carriage 111 is coupled to the lower run of the chain drive 107 for effecting the return stroke. As the conveyor 121 of the transfer means is withdrawn, the workpiece 123 starting at its leading edge that is, at its left end edge is gradually deposited on the stack 101 as it slides without wrinkling over the leading carrier roller 113, please see FIG. 10. In this manner again a continuous, smooth deposition of workpieces one after the other may be accomplished.

The carrier roller 118 cooperates with a counter roller 120 so that the endless transfer conveyor 121 is guided between these rollers as the workpieces are transported one after the other from the feed-in conveyor 134 to the stack 101. The surface of the transfer conveyor 121 is further guided over the deflection roller 122 to a driving roller 123, thence over a supporting roller 124 and from there to the gap between the rollers 118 and 120. The counter roller 120 exerts a sufficient pressure onto the workpieces to assure the necessary friction between the surface of the transfer conveyor 121 and the workpiece for obtaining a continuous and uniform transit of the workpieces without wrinkling.

After passing between the rollers 118 and 120, the transport conveyor 121 runs over the five carrier rollers 117 to 113 in that order. The transport conveyor then returns to a deflection roller 125 which in the direction of forward travel, as indicated by the arrows, is followed by another deflection or tensioning roller 126. The deflection roller is followed by a group of further rollers 127, 128, 129, 130, and 131 of which the rollers 127, 129, and 131 are journalled to the frame structure in fixed positions. The rollers 128 and 130 are supported by spring means 132 and 133 respectively whereby these rollers 128 and 130 are enabled to shuttle up and down in response to the movement of the carriage 111 to the left and right respectively.

The purpose of the springs 132 and 133 is to keep the transfer conveyor 121 under tension at all times during the forward movement of the leading carrier roller 113 for passing the transfer means over the stack when the carriage 111 moves to the left and also during the return stroke when the carriage 111 moves to the right.

This is illustrated especially by viewing FIGS. 8, 9, and 10 in succession.

The transfer conveyor 121 may be driven in any of a number of possible ways, for example, any one of the deflection and guide rollers may be a positively driven roller. In an alternative embodiment or in combination, the conveyor 121 may be driven by a drive belt 135 which runs over rollers 120, 136, and 137. The rollers 120 and 136 may be adjustable in their position relative to the frame structure whereby the pressure exerted on the workpiece and thus on the transfer conveyor 121 is adjustable.

The apparatus of FIGS. 8, 9, and 10 operates as follows. In the initial position shown in FIG. 8, the carriage 111 is in its rightmost position. If now a workpiece has been moved forward sufficiently so that its leading edge is positioned above the leading carrier roller 113, the leading edge will, for example, actuate switching means not shown, which in turn couple the carriage 111 to the upper run of the chain drive 107 as described above whereby the carriage 111 and with it the transfer conveyor 121 is passed over the stack until the leading edge of the workpiece reaches the left hand edge of the stack 101. The full, unwrinkled advance of the workpiece is assured because the forward pull by the conveyor 121 is assisted by the forward push through the drive belt 135.

When the leading carrier roller 113 has reached its extended position, the carriage 111 is decoupled from the upper run and coupled to the lower run of the chain drive 107 to begin its return stroke during which the workpiece is gradually deposited on the stack as may be ascertained from a consecutive viewing of FIGS. 8, 9, and 10. The sliding of the workpiece off the transfer conveyor 121 is aided by the forward travel of the conveyor 121. As this is accomplished, the carriage 111 pushes the leading carrier roller 113 to the right as it continues on its return stroke until the rollers touch each other whereby the intermediate connecting means 119 form downwardly extending loops.

In this embodiment, as well as the embodiment described with reference to FIGS. 1 to 7, it is the advantage of the invention that the workpiece is deposited in a gentle continuous manner so that even very flexible fabrics are not able to develop folds or creases.

When the intermediate connecting means 119 are fully extended, that is just prior to the return stroke the begin of which is shown in FIG. 9, the springs 132 and 133 are fully extended and subject to the highest tension during the work cycle. Thus, during the return stroke, the springs contract again until the carriage 111 is in its starting position shown in FIG. 8 in which the springs are subject to the least tension and in which the intermediate connecting means 119 form the loops between adjacent rollers as shown in FIG. 8. As this stage is reached, or even prior thereto, a new workpiece is advanced as described above.

The apparatus of FIGS. 8, 9, and 10 could be further modified for the piece by piece removal of the workpieces from the stack. For this purpose, the transfer conveyor 121 would run in the clockwise direction rather than in the counterclockwise direction as shown. Further, suction heads as shown in FIGS. 5, 6. and 7 would be arranged in a row above the right hand edge of the stack 101. The operation would be substantially the same as for depositing a workpiece on the stack except that on the forward stroke subsequent to lifting the right hand edge of a workpiece from the stack, the transfer conveyor 121 would gradually slide under a workpiece and on the return stroke the workpiece would be carried onto the conveyor 134 the moving direction of which would also be reversed so that it may operate as an output conveyor.

FIGS. 11, 12, 13, and 14 illustrate another embodiment of the present invention which is quite similar to the embodiments described above. This embodiment comprises also a frame structure 201 and 202 in which a stacking table 206 is movable up and down in the direction of the double arrow a.

In this embodiment, a horizontal drive means 207 such as a chain drive having upper and lower runs is supported on guide or deflection rollers 208 and 209 which are arranged above the stack 203' on the stacking table 206 in such positions that the guide roller 208 is arranged above and to the right of the left hand end 204 of the stacking table 206 while the guide roller 209 is arranged above and to the right of the right hand end 205 of the stacking table 206. As viewed in the direction of movement of a workpiece 203 to be stacked, these rollers 208 and 209 are arranged in front of the respective ends 204 and 205. A lead roller 213 is journalled to the drive chain 207 for guiding and supporting a transfer means such as an endless conveyor belt 221.

Figure 11:
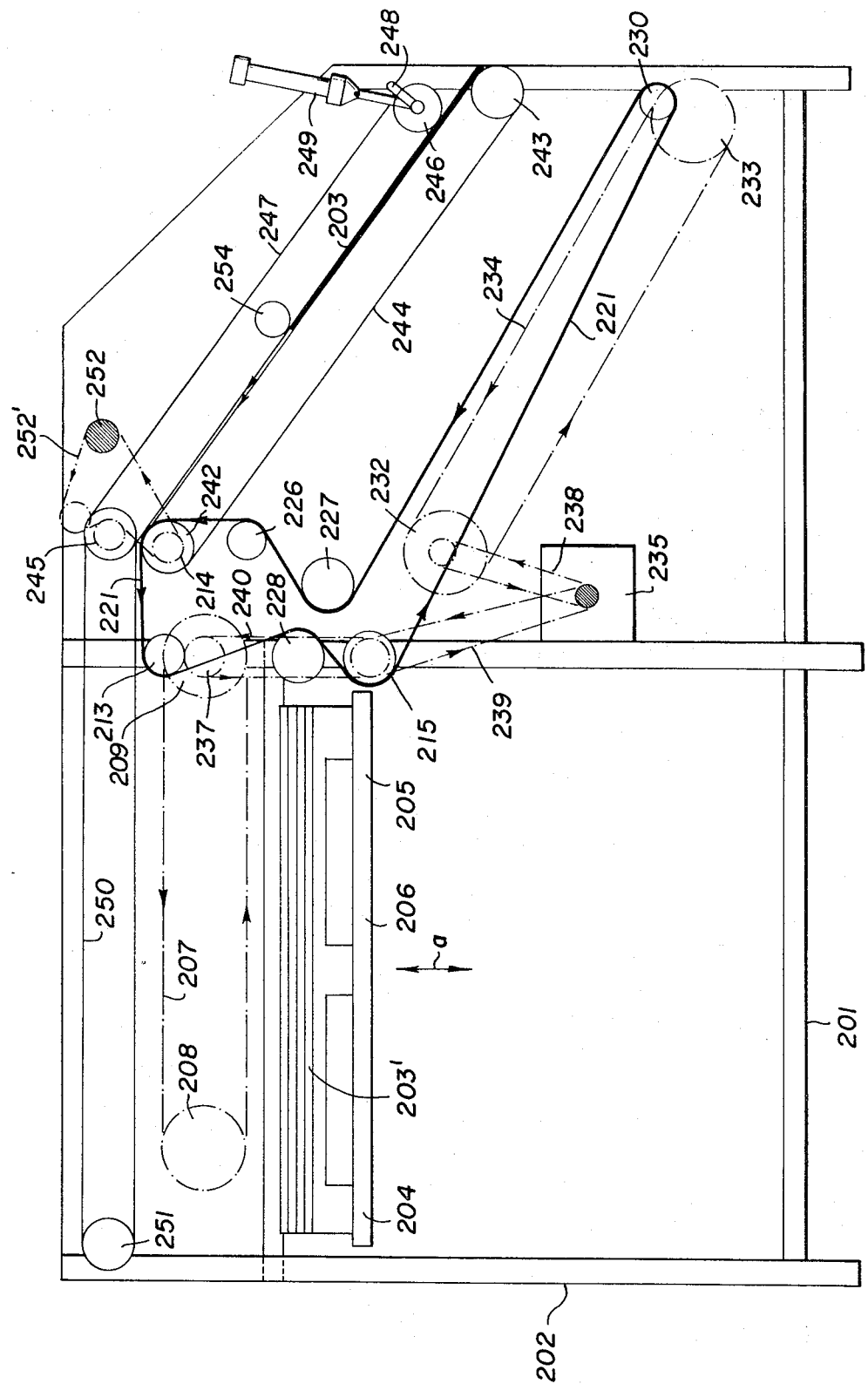
FIG. 11 is a side view of another embodiment of the stacking apparatus according to the invention, with further modified transfer means illustrated in their retracted or starting position.

During a complete revolution or run of the lead roller 213 it first moves to the left along the upper run of the drive chain 207, it then negotiates the guide roller 208 and returns to the right along the lower run of the drive chain 207 whereupon it negotiates the guide roller 209 to return into its starting position shown in FIG. 11. This movement completes a full workcycle as may be ascertained from a successive viewing of FIGS. 11, 12, 13, and 14.

The transfer conveyor 221 of the transfer means is supported and guided by means of drive and supporting rollers 214, 215 as well as stationary deviating rollers 226, 227, and 228. The transfer conveyor 221 is further guided by a roller 230 which is movable along a path 234 which may be realized in practice by a chain drive whereby the guide roller 230 is rotatably attached to the chain which in turn runs over a drive pinion 232 and a guide pinion 233. Thus, the movement of the roller 230 is determined by the drive chain 234.

A motor 235 is operatively connected to drive the chain drive 207 through connecting intermediate drive means 239 and 240 which may again be, for example, conventional belt drives. The drive shaft of the motor 235 is further connected, for example, through a belt drive 238 to the driving roller 232 of the chain drive 234. Thus, the chain drive 207 and the chain drive 234 are operated in unison with each other. As seen at the right hand side of FIGS. 11 to 14, there is provided a movable surface for continuously advancing the workpiece either toward the stack 203' or away from the stack. In the illustration, the movable surface is formed by a conveyor belt 244 which runs over rollers 242 and 243 in a counter clockwise direction for feeding the workpiece 203 to the transfer means, or in clockwise direction for feeding the workpieces away from the transfer means.

Figure 12:
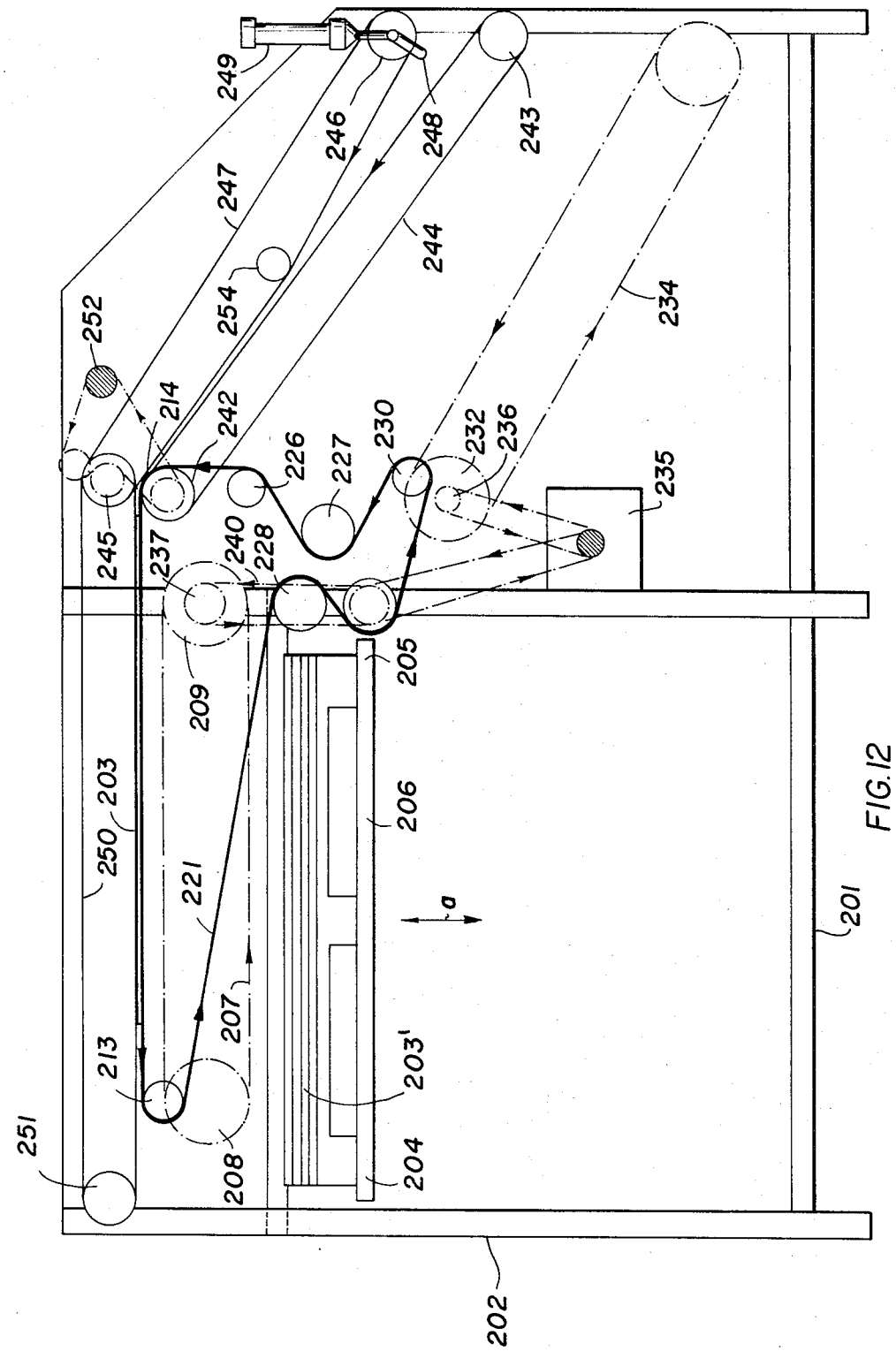
FIG. 12 is a view similar to FIG. 11, now illustrating the transfer means in an extended position whereby a workpiece has been carried over the stack.
Figure 13:
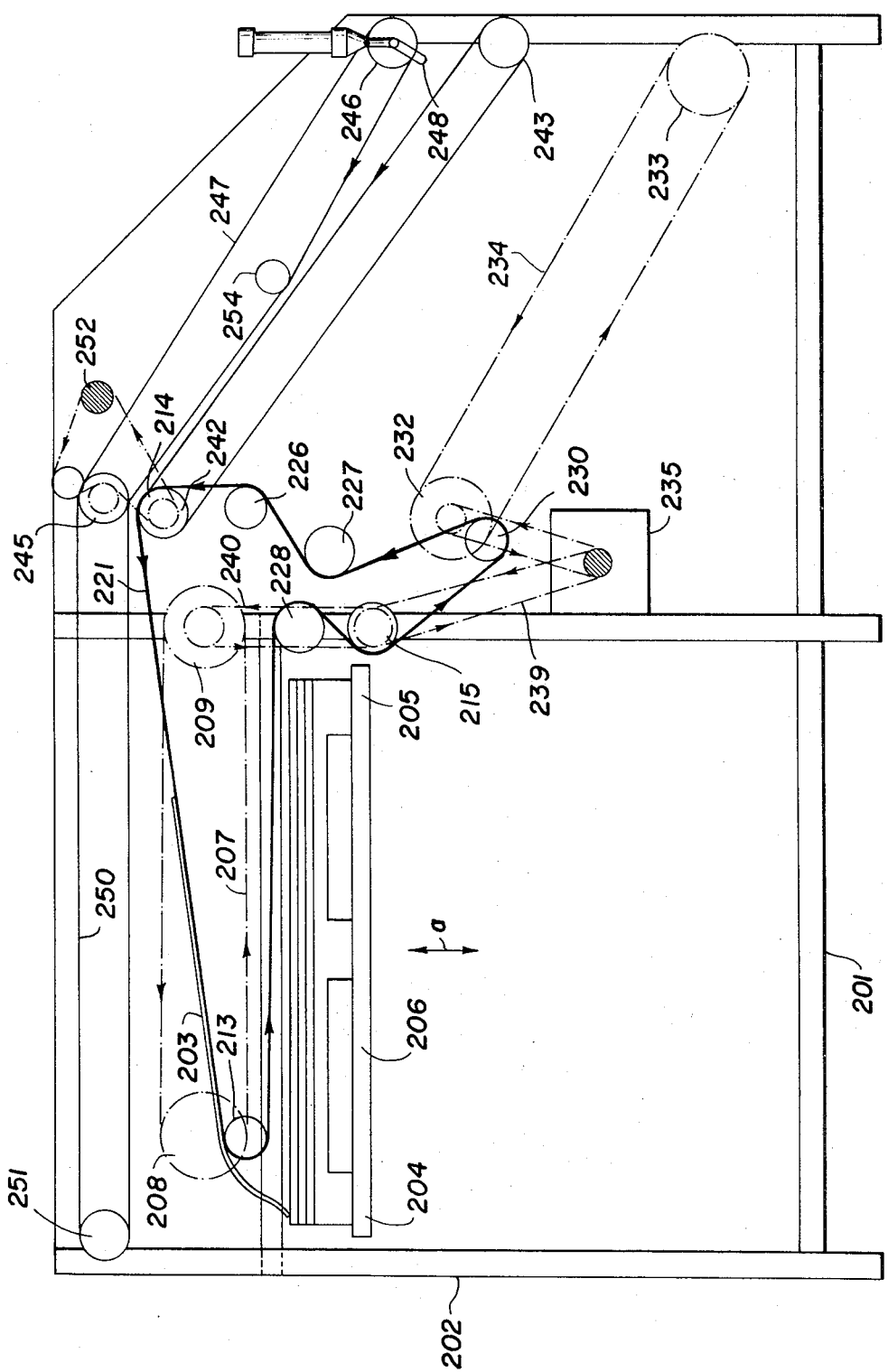
FIG. 13 is a view similar to FIGS. 11 and 12 illustrating the beginning of the retraction and thus the beginning of the deposition of the workpiece starting from its edge.
Figure 14:
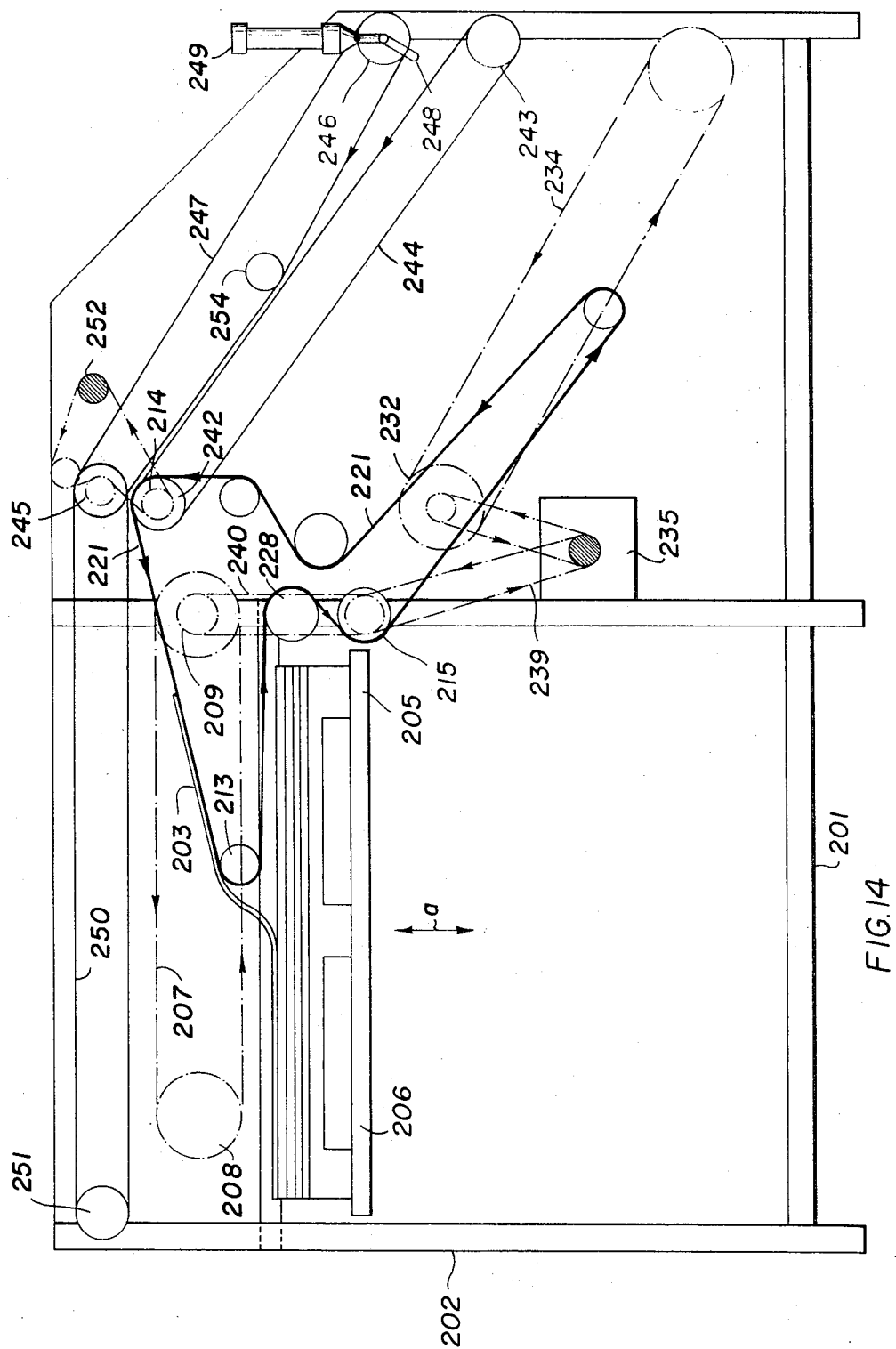
FIG. 14 illustrates the returning of the transfer means shortly before the completion of the depositing of a workpiece and also showing the gradualness of the deposition.

A workpiece 203 is held against the conveyor 244 by means of a further transport band 247 which runs around a guide and drive roller 245 journalled in a fixed position to the frame structure and around a further guide roller 246 which is adjustable in its position along a guide path 248 by adjusting means such as a piston cylinder arrangement 249. As seen in FIG. 11, the guide roller 246 is held against the conveyor 244 by said piston cylinder arrangement 249 which can also lift the roller 246 off the conveyor belt 244 as is illustrated in FIGS. 12, 13, and 14. Lifting the input end of the conveyor belt 247 off the conveyor belt 244 facilitates the feeding of the workpieces, for example, from a stamping apparatus. However, in order to assure a proper take-up of the workpiece, there is provided a pressure roller 254 positioned intermediately between the rollers 245 and 246 whereby the lower run of the conveyor 247 is held close enough against the upper run of the conveyor 244 to facilitate said take-up. Thus, the lower run of the conveyor belt 247 is prevented from being lifted along its entire length whereby a wedge shaped opening for the feeding of the workpieces is provided as best seen in FIGS. 12, 13, and 14.

A further auxiliary conveyor belt 250 is arranged to run over rollers 251 and 245 above the chain drive 207 sufficiently spaced therefrom to permit the passage of the transfer conveyor 221 over the stack 203'. The conveyor belt 250 is arranged so that its lower run is sufficiently spaced from the upper run of the transfer conveyor 221 for a workpiece to pass between the two belts of the two conveyors.

The just described conveyor belts 244, 247, and 250 as well as the transfer conveyor 221 are driven by the same drive means and thus in synchronism with each other. These drive means may comprise, for example, a chain drive 252' driven by a driving shaft 252, the motor of which is not shown.

The embodiment of FIGS. 11 to 14 operates as follows. The operation will best be understood by viewing these figures in sequence. Starting with FIG. 11, the workpiece 203 has just been inserted and the hydraulic actuator 249 has shifted the roller 246 downwardly and thus the conveyor 247 into contact with the workpiece 203. The workpiece is now advanced between the two conveyors 244 and 247 toward the transfer and auxiliary means comprising especially the transfer conveyor 221 and the auxiliary conveyor 250. In this portion of the complete workcycle, the actuator 249 still presses the conveyor belt 247 against the workpiece and thus against the conveyor 244. At the time when the workpiece is about to reach the upper end of the conveyor 244 near the roller 214, the leading rollers 213 and 230 are still in their positions shown in FIG. 11, namely at the right hand end of their respective drive means 207 and 234. That is, these rollers 213 and 230 are ready to advance along the upper run of their respective drive chains. The drive motor 235 is now switched by means sensing the position of the leading edge of the workpiece. Such sensing means are well known in the art.

Referring to FIG. 12, it is seen that the transfer conveyor 221 has passed completely over the stack 203' from the right to the left and the lead roller 213 as well as the lead roller 230, have reached the left hand end of the upper run of their respective drive means. The lead rollers 213 and 230 now begin to negotiate the left hand guide rollers 208 and 242 of their respective drive means. The result of this negotiation is seen in FIG. 13 where the delivery of the workpiece 203 has just started due to the inclination of the upper run of the transfer conveyor 221 as seen in FIG. 13. The lead rollers 213 and 230 now continue to advance on their return paths along the lower run of their respective drive means and this is illustrated in FIG. 14.

Referring to FIG. 12, it will be noted that the actuator 249 lifts the roller 248 just as soon as the workpiece 203 has moved onto the upper run of the transfer conveyor 221. Thus, the apparatus is ready to receive the next workpiece although the preceding workpiece has not yet been completely deposited.

As in the previous embodiments, it is also an advantage of the present embodiment that the workpiece is gradually and gently deposited on the stack since the lead roller 213 advances steadily along the lower run of the drive means 207 and since the slight inclination of the upper run of the conveyor 221 as well as its counter clockwise advance assist the workpiece in gently sliding down onto the stack.

As soon as the lead roller 213 reaches the lower run of its drive chain, the drive shaft 252 may be stopped so that only the drive means 207 and 234 continue to be driven in order to return the lead rollers 213 and 230 into their starting positions shown in FIG. 11 whereby the transfer conveyor 221 is also returned to its starting position and ready to receive the next workpiece since the preceding workpiece has now been completely deposited on the stack 203'.

By reversing the respective drive directions and by providing the above described suction heads, it is possible to employ the just described embodiment also for the piece by piece removal of workpieces from the stack 203' whereby these pieces would be fed out between the two conveyors 244 and 247 running in the direction opposite to that shown in the just described figures.

With regard to the embodiment of FIGS. 1 to 7, it should be mentioned, that the continuous movement in the same direction has the advantage of an especially high operational speed since slowdowns or stopping of the transfer means are avoided.

In connection with the other embodiments, high operational speeds are also accomplished because reversing movements are actually performed as revolving movements.

In the light of the foregoing description it will be appreciated that the present method handles workpieces of flexible sheet material by gently and continuously moving a workpiece onto and off a transfer surface without wrinkling by sliding the workpiece over an edge of the transfer surface. In the embodiment of FIGS. 1 to 7 such transfer surfaces are formed by the groups 8 of rotatable rods 9 and the edges are the bars 44 and 45. In the embodiment of FIGS. 8 to 10 the transfer surface is formed by the endless conveyor belt 121 and the edges are formed around the rollers 113 and 124. In the embodiment of FIGS. 11 to 14 the transfer surface is formed by the conveyor 221 and the edges are formed around the rollers 213 and 242.

Although the present invention has been described with reference to specific example embodiments, it is to be understood that it is intended to cover all modifications and equivalents within the scope of the appended claims.

What I claim is:

1. In a method for handling flat, flexible workpieces including the steps of moving a flat, substantially horizontal transfer surface continuously in a given direction, gradually sliding each workpiece in succession over an edge of said transfer surface whereby to move the workpiece onto the transfer surface without wrinkling, advancing the transfer surface for moving the workpiece while maintaining it in a substantially flat position and then again gradually sliding the workpiece off the transfer surface over an edge thereof, the improvement comprising contacting the upper surface of a workpiece with moving endless belt means to prevent wrinkling while the lower surface of the workpiece is moved onto the transfer surface, and increasing the surface friction between said upper workpiece surface and said belt means by stopping said belt means whereby said friction between the upper workpiece surface and the belt means is larger than the friction between the lower workpiece surface and the transfer surface to prevent wrinkling when the workpiece slides off the transfer surface.

2. In an apparatus for handling flat, flexible workpieces wherein a stacking table is arranged for cooperation with revolving workpiece transfer surface means having a workpiece take-up portion and a workpiece delivery portion, which surface means are operatively connected to drive means for continuously revolving said transfer surface means which run over guide means for passing the transfer surface means over said stacking table, and wherein workpiece holding means are arranged above said stacking table to cooperate with said transfer surface means in transferring of workpieces when the transfer surface means pass over the stacking table between the workpiece holding means and the stacking table, the improvement comprising endless belt means having a lower run which acts as said workpiece holding means, a pair of rollers for each belt means, means for supporting the pair of rollers with its respective belt means above the endless workpiece transfer surface means to assure a surface contact between said lower run of said endless belt means and the upper workpiece surface, and drive means operatively connected to one roller of a pair of rollers for individually driving and stopping the movement of said belt means when a workpiece is being transferred.

3. The apparatus according to claim 2, further comprising a plurality of workpiece transfer surfaces, wherein said belt means comprise a plurality of individual belts arranged in rows and columns whereby the belts of adjacent rows are staggered relative to each other, said drive means including individual clutch means for each belt whereby certain belts may successively cooperate with successive ones of said delivery portions of said workpiece transfer surfaces in an overlapping stacking operation.

4. The apparatus according to claim 2, further comprising suction means arranged above said workpiece transfer surface means along an edge of said stacking table and across the transport direction for lifting an edge of a workpiece, and wherein said drive means for said transfer surface means are reversible for reversing the transport direction whereby workpieces may be removed from a stack on said table.

5. The apparatus according to claim 2, further comprising an input conveyor means, guide rollers for said input conveyor means, a swivel arm for supporting said guide rollers, and means for locking said swivel arm in a desired angular position relative to the horizontal.

6. The apparatus according to claim 2, wherein said workpiece transfer surface means comprise a pair of endless chains arranged in laterally spaced relationship, and groups of rods rotatably connected with their ends to said endless chains, whereby the rods forming a group are closely spaced from each other so that each group of rods forms a workpiece receiving surface, said groups of rods being spaced from each other along said endless chains, and wherein each group of rods also comprises two non-rotating bars one of which is arranged at each end of a group of rotatable rods, at least one of said bars having a wedge shaped cross section.

7. The apparatus according to claim 2, wherein said workpiece transfer surface means comprise an endless conveyor belt, two movable guide rollers for said endless conveyor belt, and drive means connected to said guide rollers for moving said guide rollers along predetermined revolving paths.

8. The apparatus according to claim 7, wherein said drive means comprise two endless chain drives to which said two guide rollers are attached respectively, and means for moving said chain drives in unison for reciprocating said guide rollers along said paths.

9. The apparatus according to claim 7, wherein said endless belt means are arranged to cooperate with said endless conveyor belt which forms said transfer surface.

10. The apparatus according to claim 9, further comprising guide means for said endless belt means and actuator means for adjusting the position of at least one of said guide means to form a wedge shaped spacing between said movable surface and the endless band cooperating with said movable surface.

* * * * *